J. S. DALEN.
AGRICULTURAL IMPLEMENT.
APPLICATION FILED AUG. 6, 1919.

1,329,888.

Patented Feb. 3, 1920.

WITNESSES
L. A. Paley
P. H. Pattison

INVENTOR
J. S. DALEN
BY
ATTORNEYS

UNITED STATES PATENT OFFICE.

JACOB S. DALEN, OF CARBURY, NORTH DAKOTA.

AGRICULTURAL IMPLEMENT.

1,329,888.  Specification of Letters Patent.  Patented Feb. 3, 1920.

Application filed August 6, 1919. Serial No. 315,703.

*To all whom it may concern:*

Be it known that I, JACOB S. DALEN, a citizen of the United States, and a resident of Carbury, in the county of Bottineau and State of North Dakota, have invented a new and Improved Agricultural Implement, of which the following is a full, clear, and exact description.

This invention relates to new and useful improvements in agricultural implements, and it pertains more particularly to a device for cutting and gathering weeds.

The primary object of the invention is to construct a device of this character which in addition to cutting the weeds, gathers the same in piles in order that they may be burned. Heretofore these weeds have been cut and raked in the ordinary way into piles which have been subsequently burned, but the present invention contemplates the burning of the weeds at the same time they are cut from the ground.

With the above and other objects in view, reference is had to the accompanying drawings, in which—

Figure 1:
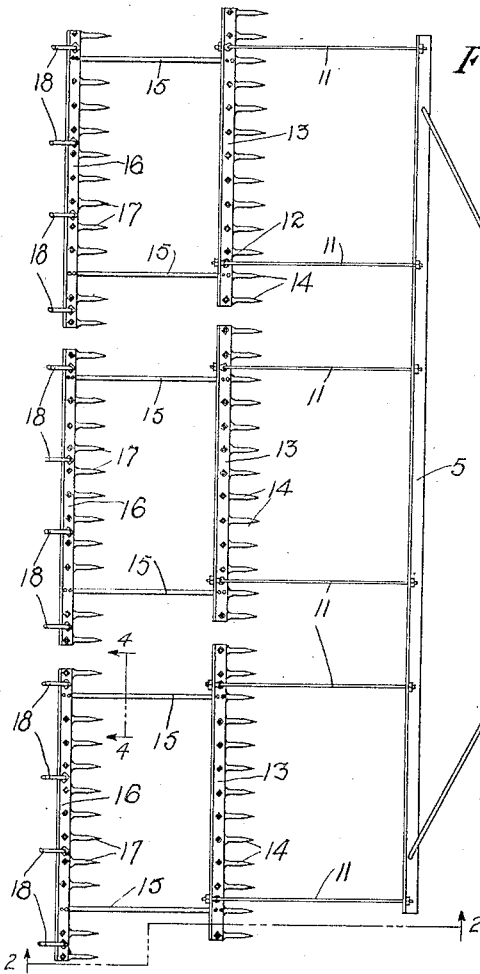
Figure 1 is a top plan view.
Figure 3:
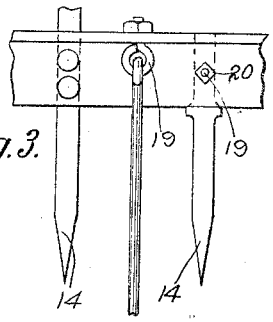
Fig. 3 is a detail segmental view.

Referring more particularly to the drawings, the reference character 5 designates an angle bar preferably of L shape. Secured to the forward edge of the angle bar 5, are links 6, the forward ends of which are connected to a ring 7. Pivotally secured to the ring 7, by means of a clevis 8, is a doubletree 9, to the opposite ends of which are connected the swingletrees 10.

Figure 4:
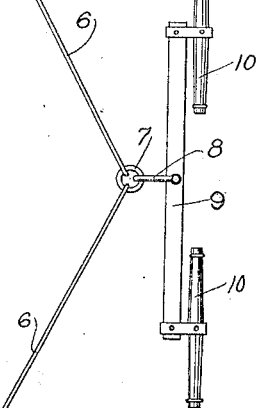
Fig. 4 is a sectional view taken on the line 4—4 of Fig. 1.
Figure 4:
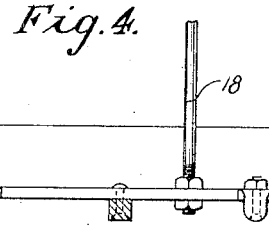
Figure 2:
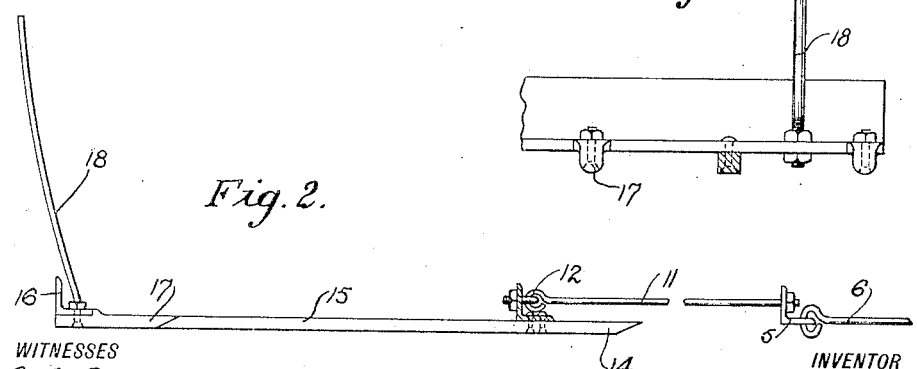
Fig. 2 is a sectional view on the line 2—2 of Fig. 1.

Extending rearwardly from the vertical wall of the angle bar 5, are links 11, said links being arranged in pairs as shown in Fig. 1. Pivotally secured by means of eyebolts or the like 12, to each pair of links 11, are angle bars 13, and rigidly carried by the front edge of each of the angle bars 13, is a plurality of teeth 14. Rigidly secured to the angle bars 13, near their ends, and projecting rearwardly therefrom are bars 15, and these bars 15 are formed integral with that tooth 14 with which they are in longitudinal alinement. Connected to the rear ends of said bars 15, are angle bars 16, the front edge of each of which is provided with spaced teeth 17, said teeth being similar to those heretofore mentioned and described by the reference number 14. The angle bars 16 are of the same length as the angle bars 13, but, as shown in Fig. 4, the rear angle bars 16 are each offset with respect to their corresponding forward angle bars 13.

The space between the teeth 14 and the space between the teeth 17, are approximately the same, and by offsetting the rear angle bars 16, it will be seen that the teeth of the angle bars 13 will project farther to the side on one side of the machine than will the teeth of the rear angle bars 16, while the end tooth of the rear angle bars on the opposite side of the machine will project beyond the end tooth of the respective angle bars 13.

Secured to each of the rear angle bars 16, and projecting upwardly and rearwardly therefrom are resilient fingers 18, said resilient fingers being rigidly carried by their respective angle bars.

The teeth 14 and 17 are rigidly secured to their respective angle bars by means of bolts 19, upon the free ends of which are secured nuts 20.

The device is adapted to be moved over the ground by means of the draft links 6 and the links 11, and the teeth 14 engage the weeds and cut them off, said weeds falling in a position where they are picked up by the teeth 17.

When a sufficient quantity of waste accumulates in advance of the fingers 18, the same is burned or set on fire. Movement of the device over the field is then continued, the device carrying with it the burning weeds, and as weeds are subsequently cut and gathered by the teeth, they are added to the burning piles of weeds already collected and are thereby consumed.

I claim:

1. A device of the character described comprising a relatively long angle bar, a plurality of links extending rearwardly from the vertical wall of said bar, a plurality of relatively short bars mounted at the rear of said bar and pivotally connected to said links, a plurality of forwardly projecting teeth carried by said relatively short bars, a plurality of rods rigidly secured to said relatively short bars and extending rearwardly thereof, bars of a length equal to said relatively short bars carried by said links, said last-mentioned bars being offset with respect to the relatively short bars and vertically disposed resilient members carried by the last-mentioned bars.

2. A device of the character described comprising a relatively long angle bar, a plurality of links extending rearwardly from one of the webs of said angle bar and arranged in pairs, an angle bar carried by each pair of links, a plurality of forwardly projecting teeth rigidly carried by each of said last-mentioned angle bars, rigid members formed integral with certain of the teeth carried by each of said angle bars and projecting rearwardly therefrom, said rigid members being arranged in pairs, and angle bars having a plurality of forwardly extending rigid teeth connected to the rear end of each of said rearwardly projecting rigid members, substantially as described.

JACOB S. DALEN.